United States Patent [19]
Saunders

[11] 3,996,569
[45] Dec. 7, 1976

[54] INFORMATION STORAGE SYSTEMS AND INPUT STAGES THEREFOR

[75] Inventor: Robert John Dowrick Saunders, Great Bookham, England

[73] Assignee: The British Food Manufacturing Industries Research Associated, Leatherhead, Great Britain

[22] Filed: Nov. 17, 1975

[21] Appl. No.: 632,836

Related U.S. Application Data

[63] Continuation-in-part of Ser. No. 462,577, April 19, 1974, abandoned.

[30] Foreign Application Priority Data

Apr. 19, 1973 United Kingdom ............ 19300/73

[52] U.S. Cl. .......................... 340/173 R; 340/172.5
[51] Int. Cl.² ...................................... G11C 13/00
[58] Field of Search ..................... 340/173 R, 172.5

[56] References Cited
UNITED STATES PATENTS 3,962,687   6/1976   Suzumura .................... 340/173 R

*Primary Examiner*—Terrell W. Fears
*Attorney, Agent, or Firm*—Karl W. Flocks

[57] ABSTRACT

The disclosure herein relates to information storage systems and input stages for such systems together with a method of operating such systems. The input stage is designed to accept address signals composed of keyword pairs so that each item of information to be stored or retrieved must be identified by pairs of keywords which may be in plain language. For this purpose the input stage is arranged to recognize three distinct symbols, namely keyword characters, a spacer signal identifying the end of the first keyword of a pair and a terminal signal identifying the end of a pair of keywords. The input stage also identifies a final terminal signal which identifies the end of a set of keyword pairs. The address signal is read symbol by symbol to gate means in the input stage which operates to check that the sequence is in the form of a keyword character or characters, a spacer signal, a keyword character or characters and either a keyword pair terminal signal or a set of keyword pair terminal signals. Address signals in this sequence are accepted and others are rejected. A modification is described to enable the storage system to be searched using only a single keyword. As with a single keyword there is no spacer signal between pairs of keywords, additional gates are provided which can be set to reject the occurrence of a spacer signal and to bypass those gates in the basic system which require a spacer signal to be identified.

16 Claims, 3 Drawing Figures

INFORMATION STORAGE SYSTEMS AND INPUT STAGES THEREFOR

RELATED APPLICATION

This application is a continuation-in-part of application Ser. No. 462,577 filed Apr. 19, 1974, now abandoned.

FIELD OF THE INVENTION

This invention relates to information storage systems and input stages therefor.

BACKGROUND OF THE INVENTION

Information storage systems are known in which the information to be stored is identified by a word (sometimes referred to as a keyword) which may be a plain language word or a code word derived from the information to be stored. Generally, the information to be stored may be identified by a plurality of such words and, in order to enable the information, once stored, to be retrieved, it is identified by that plurality of words together or by each word separately and hence stored in a corresponding number of locations in the memory.

For example, if an item of information $X_1$ is identified by a number of key-words, say $K_1 - K_5$, then the information could be addressed to the memory store by the keywords taken together, i.e., $K_1, K_2, K_3, K_4, K_5/X_1$. However, in order to obtain maximum efficiency of recall of the stored information, the information should be stored under each of all possible combinations available with the number of individual keywords used (i.e., N! where N is the number of keywords in the set). In this case, this would mean entering a total of $5! \times 5$ keywords or approximately $5! \times 5 \times 8$ characters = 4,800 characters per item of information (8 being an assumed number of characters per keyword).

Alternatively, an item of information may be identified by each of the plurality of keywords separately. In this case, the information would be addressed to the memory store as $K_1/X_1$; $K_2/X_1$; $K_3/X_1$; $K_4/X_1$; $K_5/X_1$. In the course of time, each store location would accommodate numerous items of information. Thus, for example, the store location identified by keyword $K_1$ may contain information items $X_1, X_2, X_7, X_{103}, X_{206}$ etc. However, frequently recurring keywords will direct a large number of items of information to the corresponding store location whereas uncommon keywords will direct only a few items of information to the corresponding store location. This results in three distinct disadvantages:

a. each storage location should be designed to accommodate the maximum number of items of information envisaged for any of the keywords for optimum efficiency, b. as information retrieval may take place by reading the information stored at each location identified by each one of a number of keywords related to the information to be retrieved and selecting the items of information common to each location, it will be apparent that long strips of items of information may have to be compared, and c. the available storage capacity must be M times that referred to at a. above where M is the maximum number of keywords.

As mentioned above, in the known information storage systems referred to, each storage location is identified by a single keyword, e.g., $K_1 - K_5$, and the same item of information may be stored in each of the storage locations identified by the keywords $K_1 - K_5$.

It is known to provide compound memories which are composed of random access arrays in combination with content addressable arrays, the latter being frequently called associative arrays. Associative arrays formed into associative memories have been employed for the purpose of relating arbitrary symbolic identifiers of information such as $K_1 - K_5$, hereinafter referred to as "effective addresses" to corresponding physical memory locations. The associative memory compares the effective address with the effective addresses in its memory and, if an associative comparison (called a match) is found, reads out the actual address of the information block within the random access memory and accesses the addressed information block in the random access array so as to read or write information out of it into that block. Such a compound memory is disclosed in U.S. Pat. No. 3,685,020 to Robert M. Meade dated Aug. 15, 1972, in which is disclosed a compound memory system in which a random access array includes an associative array as part of its accessing means. There is further disclosed a nested configuration of compound memories in which the effective address is transmitted to the lowest order compound memory but held available on buses for each of the higher order compound memories. If no match is found for the effective address in the lowest order compound memory, a gating signal is generated to gate the effective address to the next higher order compound memory and this continues up the nest until a match is found and the address identified. If no match is found, an error signal is generated.

Although U.S. Pat. No. 3,685,020 discloses how an address may be tested up a nest of compound memories to find a match for the effective address, it is only concerned with identifying the actual address of the information block within the random access array in the compound memory and an information storage system embodying such compound and multilevel memories suffers from the three distinct disadvantages identified above.

The serial testing of an address is also known from U.S. Pat. No. 3,806,882 to Alan Bothwell Clarke dated Apr. 23, 1974 which is concerned with security for computer systems in which an operator is provided with a key containing identification data and which, when plugged into a computer system is compared with corresponding stored data and if found to match causes a signal to be generated to enable the operator to have access to information stored in the system and, if found not to match, causes an alarm signal to be generated. As the stored information may be classified in fractions of information of decreasing importance, an operator is issued with a key containing identification data corresponding to the level of importance of the information to which the operator is authorised for access and, when the key is plugged into the system, the identification data is compared with the data stored in one computer key storage unit and if a mis-match is found is referred to another comparator and so on until the level of authorised information is identified and made available. If no match is found, an alarm signal is generated.

Both U.S. Pat. Nos. 3,685,020 and 3,806,882 effectively disclose information storage systems in which data representing an address or a key is tested in a comparator for a match with stored data and in the vent of a mis-match is passed on to a succeeding comparator until a match is found and the address identified. The matching comparator effectively generates a yes signal in the event of a match to initiate a subsequent operation or a no signal in the event of a mismatch which is used to pass the address to the succeeding comparator. Neither U.S. Pat. Specification is, however concerned with identifying within the address data a series of words occurring in a predetermined sequence, a separate comparator being associated with each word position in the sequence and being operable to prevent further reading of the address data when the words do not appear in the predetermined sequence.

It is an object of the present invention to provide an improved information storage system in which the three distinct disadvantages referred to above are materially reduced.

It is a further object of the invention to provide an improved storage system in which each item of information to be stored is identified by two keywords (referred to as keyword pairs) the two keywords in a pair being separated by a spacer signal (considered as a word) and a keyword pair being followed by a terminal signal (considered as a word) identifying the end of a keyword pair whereby each storage location is identified by a keyword pair and the capacity of each storage location can be materially reduced and information retrieval time is also materially reduced.

SUMMARY OF THE INVENTION

According to the present invention there is provided for use in an information storage system an input stage comprising gate means responsive to an address signal composed of a first keyword signal, a spacer signal, a second keyword signal, and a terminal signal to admit such address signal and associated information to the system and to reject all other forms of address signals.

Preferably the gate means comprises comparison means operable to receive the address signal, symbol by symbol, and to generate output signals respectively identifying the received address signal symbol as a keyword character, a spacer signal, a terminal signal or an unacceptable symbol, a keyword character bistable device responsive to a keyword character identifying output signal to change its state from the "0" to the "1" condition, a spacer signal bistable device capable of changing state from the 0 to the 1 condition in response to the occurrence of a spacer signal identifying signal, a terminal signal bistable device capable of changing state from the 0 to the 1 condition in response to the occurrence of a terminal signal identifying signal, means responsive to the 1 condition of the keyword character bistable device and the 0 condition of the spacer signal bistable device to change the state of the spacer signal bistable device to the 1 condition, rest or maintain the terminal signal bistable device in the 0 condition and rest the keyword character bistable device to the 0 condition upon the occurrence of a spacer signal identifying output signal, and means responsive to the 1 condition of the keyword character bistable device, the 1 condition of the spacer signal bistable device and the 0 condition of the terminal signal bistable device to change the state of the terminal signal bistable device to the 1 condition, reset the spacer signal bistable device to the 0 condition and reset the keyword character bistable device to the 0 condition upon the occurrence of a terminal signal identifying output signal.

The invention also extends to an information storage system having an input stage according to either one of the two immediately preceding paragraphs.

The gate means responds to and accepts an address signal which is composed of four items, two of which are similar but not identical although variable, i.e., the two keyword signals and the other two items of which are different from each other and from the keywords and are denoted by a fixed symbol or symbols, i.e., the spacer signal and the terminal signal.

The invention also extends to a method of operating an information storage system which comprises entering an address signal into the system, reading the address signal symbol by symbol to generate recognition signals identifying the symbol as a keyword character, a spacer signal, a terminal signal or an unacceptable symbol, utilising each keyword character recognition signal to set a keyword character bistable device to the 1 condition, utilising each spacer signal recognition signal to change the set of a spacer signal bistable device to the 1 condition in the event that the spacer signal bistable device is initially in the 0 condition and the keyword character bistable device is in the 1 condition and utilising each terminal signal recognition signal to set a terminal signal bistable device to the 1 condition in the event that the keyword character bistable device is in the 1 condition, the spacer signal bistable device is in the 1 condition and the terminal signal bistable device is initially in the 0 condition.

In use, the information storage system of this invention will only accept items of information identified by two keywords. This of itself reduces the number of storage locations required and tends to materially reduce the inequality between the number of items of information stored at one location with respect to another.

In practice, an operator would examine the information to be stored and derive a number of keywords. These keywords would be examined to see how they can be combined into pairs by association of meanings. Some possible pairs will automatically be rejected as lacking an association in meaning. For example, assuming that there are five keywords $K_1 - K_5$, all possible combinations in pairs can be used but, generally, common sense will show which of the individual keywords should be combined to form pairs and may result in an association of the following form:

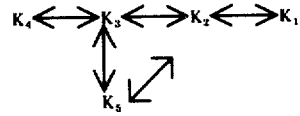

In this case the keyword pairs to be used would be $K_4/K_3$; $K_3/K_2$; $K_2/K_1$; $K_3/K_5$; $K_5/K_2$! The operator would then enter into the input stage of the storage system sequentially each pair of keywords followed by the item of information $X_1$ to be stored. This item of information $X_1$ may, for example, be information identifying the content of a technical article, the author(s) and the physical location where that article can be found. The pair of input keywords would be entered into the input system as four signals $K_4/K_3$! After entering $K_4$, the slash is entered to identify the end of a keyword. The keyword $K_3$ is then entered followed by the exclamation signal which serves to identify the end of the second keyword and the termination of the address signal. The input stage has an associated gate which responds to this form of address signal by accepting it and the associated information signal into the system. If the slash is omitted, the gate only recognises the presence of one keyword and rejects the entry. Similarly, if the exclamation signal immediately follows the slash, the entry is rejected as having only one keyword. Also, if the exclamation signal is omitted, the gate rejects the entry as being not terminated.

It will be appreciated that because the gate will only accept pairs of keywords, the capacity of the storage location can be materially reduced as the entry is more specific than is the case with a single keyword. Retrieval time is materially reduced as the number of items of information associated with each pair of keywords which is required to be compared with a string of items associated with another pair of keywords is considerably less. Also the capacity of the storage system, and hence its costs, will be reduced.

It will also be appreciated that the item of information $X_1$ may be code number identifying information represented thereby in another memory store. For example, this code number may be automatically and sequentially generated by the system so that once the operator has identified the keyword pairs $K_4/K_3$; $K_3/K_2$; $K_2/K_1$; $K_3/K_5$; $K_5/K_2$ (according to the above example) and the system has recognised them as acceptable, it will automatically assign the next sequential code number to these keyword pairs and pass them to the store location with that code number. That code number in a different store will also identify the information represented by the keyword pairs. When the information is to be retrieved, the system will identify the code number or numbers common to the interrogating keyword pairs and can be arranged automatically to retrieve from that different store the information associated with the retrieved code number or numbers. Thus, in one application, the operator will identify the keyword pairs to the system and the information associated therewith and the system will allocate a code number to both the keyword pairs and the information and route these to different stores. On interrogation by keyword pairs, the system will identify the code number associated therewith and then interrogate the separate information store to retrieve the information associated with that code number.

Basically, it is intended that natural language should be used to identify the keywords. In most applications, there are many terms which cause problems with indexing, i.e., synonyms, homonyms, and multiple terms. Some form of control should be exerted to remove any uncertainty as to which term out of two or more terms should be used at any time.

Conventionally, a list of all the terms that can be used is constructed and each time an address is supplied to the system, this list or Thesaurus is used to see whether the terms employed are acceptable.

The system of the present invention employs a list of terms which cannot be used because the number of terms used will greatly exceed the number of terms which cannot be used. This list can be termed a stop list.

It is a further feature of the present invention to provide an information storage system comprising an input stage adapted to receive an address signal intended to identify an associated storage location and containing two keyword signals, means operable to compare the keyword signals with a store of keyword signals and to reject address signals concerning a keyword stored in said store and gate means responsive to address signals not rejected by said comparison means and to the sequential occurrence in said address signal of a first keyword signal, a spacer signal, a second keyword signal and a terminal signal to admit such address signal and associated information to the system and reject all other address signals.

Embodiments of the invention will now be described by way of example, reference being made to the accompanying drawings in which.

Figure 1:
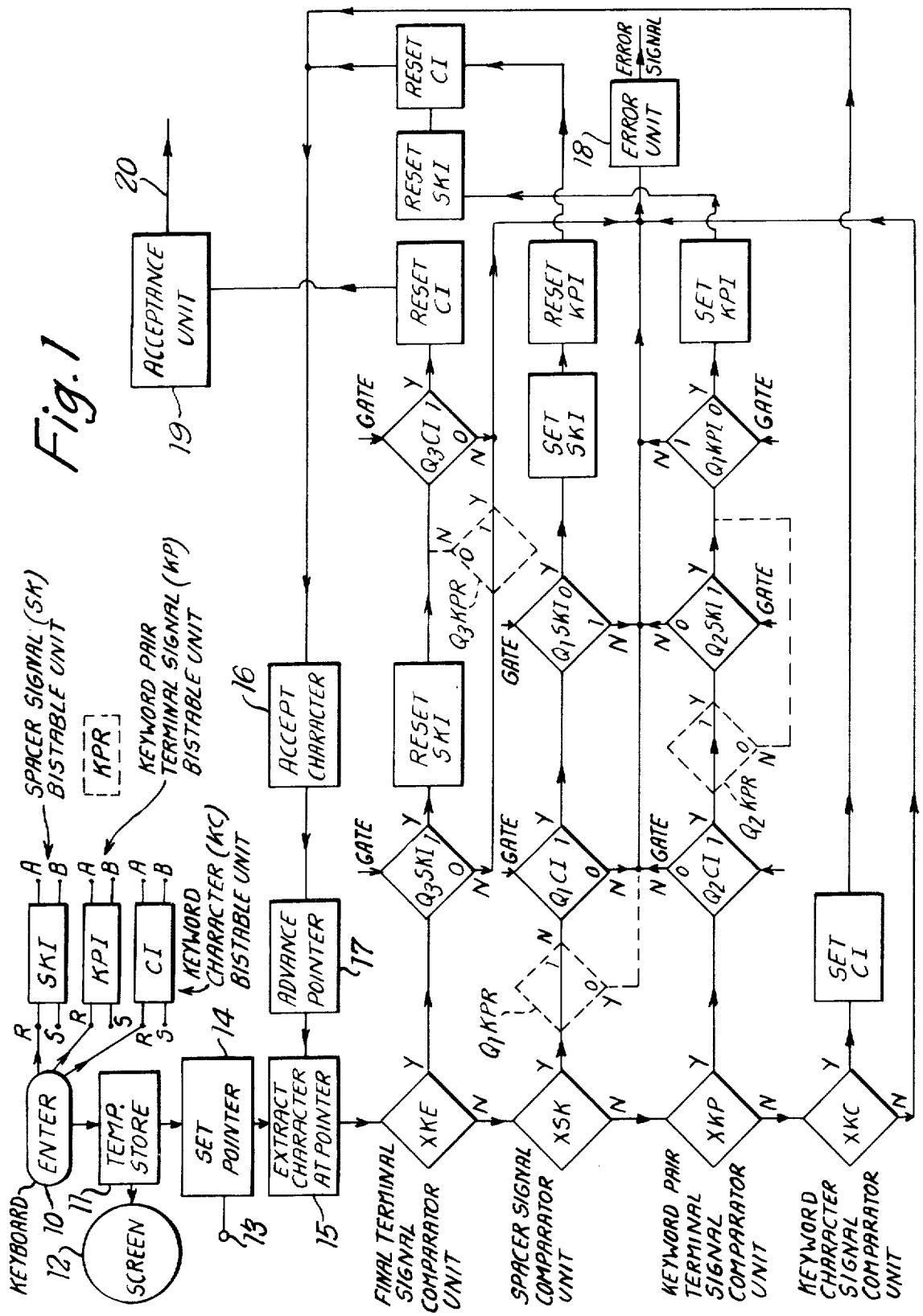
FIG. 1 is a block diagram illustrating one embodiment of the invention with a modification being illustrated in dotted lines.

It will be appreciated that an information system having an input stage arranged to accept or reject an address signal and information associated with such an address signal must have some means for entering the address signal and associated information. In the present example this is provided by a known form of keyboard which enters the address and associated information into a temporary store with which is associated a cathode ray tube screen on which is displayed the entered information until it is erased. Also in known manner, there is provided an electronic pointer which identifies on the screen the character space which is active, i.e., which is about to be filled with a character or about to be read. Such a pointer can move incrementally and automatically from character space to character space so that, on entry, the operator at the keyboard can identify the next space in which entry will be made. On reading the entered information, the operator can identify which character space is being used and, in the event of an incorrect entry, the character space which is incorrectly filled because the pointer does not move on when the input stage rejects an entry. This error can be corrected by what is, in effect, over-typing into the character space and the operator may have the facility of manually displacing the pointer to any character space on the screen to make that space active and to effect an entry.

According to the present invention the address signal is composed of at least one keyboard pair and may be composed of a number of keyword pairs.

Assuming that the address signal is composed of a number of keyword pairs in the form $K_1/K_2$; $K_2/K_3$; $K_4/K_5$! the input stage must be capable of distinguishing keywords K, spacer signals "/", keyword pair terminal signals ";" and terminal signal "!" denoting the end of a set of keyword pairs. The apparatus is arranged to respond to such signals in such manner that occurrence of a keyword pair terminal signal (KP) ";" or a terminal signal (KE) "!" indicating the end of a set before the occurrence of a spacer signal (SK) "/" is rejected. The keywords K may be composed of any number of characters (KC) which may be upper case alpha, numeric or a dash "--".

A number of bistable units are provided to indicate whether or not a particular symbol has occurred, being normally in the reset or 0 condition in the absence of an associated signal and being switched to the set or 1 condition when such an associated signal is recognised. Thus there is provided bistable unit CI which is set to the 1 condition when a keyword character is recognised, bistable unit SKI which is switched to the 1 condition when a spacer signal SK (representing the end of a single keyword) / is recognised and bistable unit KPI which is switched to the 1 condition when a keyword pair terminal signal (KP) ; is recognised. There is also provided a number of interrogatory units operable in response to an interrogatory signal to interrogate the bistable units individually to ascertain their condition and to provide a "yes" or "no" answer at either their Y output or their N output as the case may be.

There are also four comparison units XKE, XSK, XKP and XKC which, as will be explained, are connected in series and which are fed with the information being read and which respond to that information respectively as being a terminal signal KE, a spacer signal SK, a keyword pair terminal signal KP or a keyword character signal KC by producing a yes answer at their Y output to initiate a further operation or a no answer at their N output by feeding the information to the next comparison unit in the series for identification.

The input stage of an information storage system according to the invention comprises a typical keyboard 10 connected to a temporary store 11 for the data sequentially entered through the keyboard and a C.R.T. display screen 12 connected to the temporary store 11 to display the entered data. The keyboard 10 includes an "entry" key to denote the commencement of an entry and which generates a reset signal which is supplied to three bistable units SKI, KPI and CI. Each bistable has two inputs identified as R and S and two outputs identified as A and B. Reset signals when supplied to input R of the bistables reset the bistable to the 0 condition in which output A is 0 and output B is 1. Set signals when applied to input S of the bistables set the bistable in the 1 condition in which output A is 1 and output B is 0. Thus at the commencement of an entry the bistables SKI, KPI and CI are reset to the 0 condition.

Figure 2:
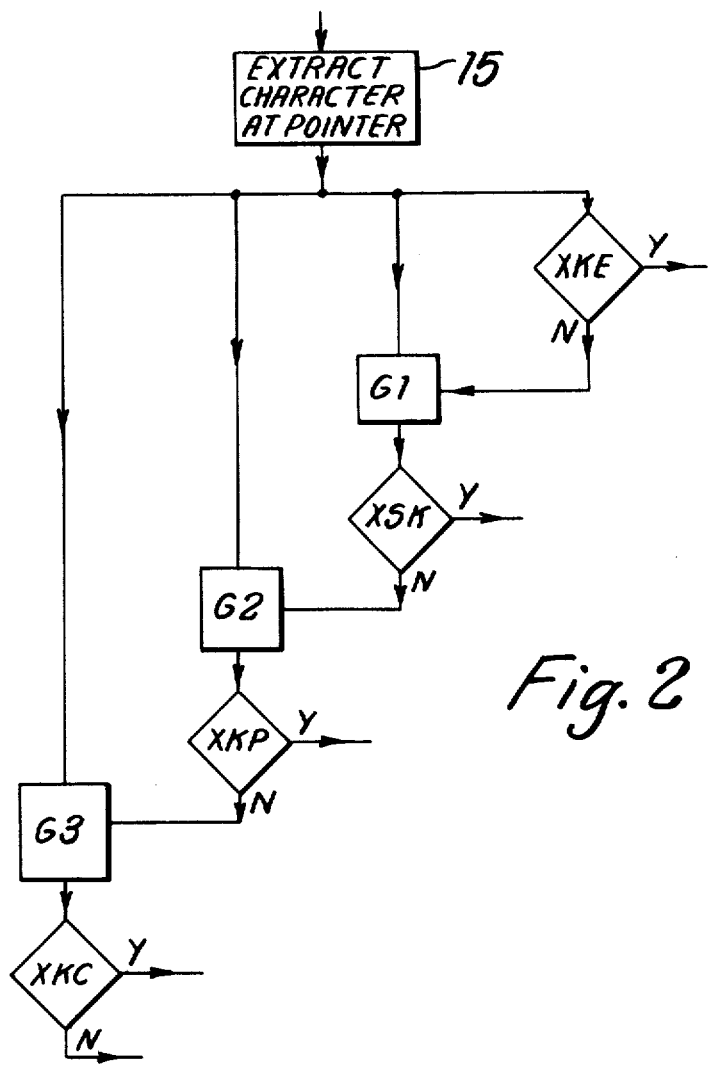
FIG. 2 is a block diagram illustrating a chain of comparators capable of being used in the FIG. 1 embodiment.

The temporary store 11 is connected through a read unit 13, 14, 15 to the comparators XKE, XSK, XKP and XKC arranged in a chain. The read unit 13, 14 and 15 comprises, in known manner, a pointer setting unit 14 which gates a symbol or character in the store to the reading unit 15 and generates a pointer in the form of a dot on the screen 12 over the symbol or character being read so as to visually identify it. The pointer is moved in steps by the button or key 13 so that the stored data can be read sequentially. The comparator XKE tests the character being read for a final terminal signal (KE) !, the comparator XSK tests for a spacer signal (SK) /, the comparator XKP tests for a keyword pair terminal signal (KP) ; and the comparator XKC tests for a keyword (KC). Each comparator has a Y output denoting a match and an N output denoting a mismatch and which is used to refer the data being read to the next comparator in the chain except in the case of the last comparator XKC where it is used to activate an error unit 18 and generate an error signal. The construction of such a chain of comparators can take various forms as will be apparent to those skilled in the art and one such is illustrated in FIG. 2. It will be seen that the output of the read unit is supplied directly to comparator XKE and through gates G1, G2 and G3 respectively to comparators XSK, XKP and XKC. Gate G1 is enabled by the N output of comparator XKE, gate G2 by the N output of comparator XSK and G3 by the N output of comparator XKP. Thus the information being read is tested sequentially by the comparators in the chain for a match. This arrangement is similar to that disclosed in U.S. Pat. Specification No. 3,685,028 in which an address is tested sequentially in a chain of compound memories for a match. It will be understood, however, that the information being read could be supplied to all four comparators simultaneously as they are concerned with identifying four distinct types of character and only one of them could produce a match and a corresponding signal at its Y output. It is, however, necessary to identify when no match occurs in any of the four characters and this could be achieved by connecting the four N outputs to a four-input AND gate which would only produce an output signal to the error unit 18 when all four inputs were energised by the four N outputs.

The Y output from comparator XKC is connected to the S or set input of bistable CI to set the bistable in the 1 condition and is also supplied to accept character unit 16 to indicate a match and acceptance of the character and supply a signal to unit 17 which operates to step the pointer to the next character to be read. The unit 17 can be operated directly from the Y output of comparator XKC but the unit 16 is preferred to generate a signal of appropriate level to activate unit 17 in response to the Y output of comparator XKC.

Figure 3:
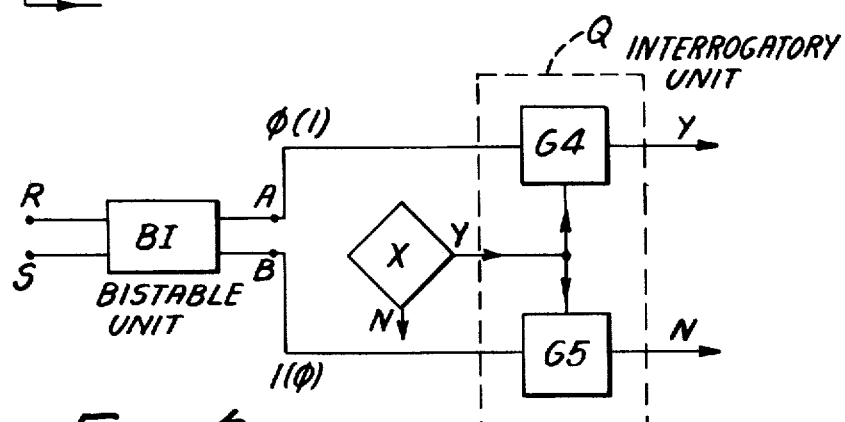
FIG. 3 is a block diagram illustrating a form of interrogatory unit capable of being used in the FIG. 1 embodiment.

The Y output from comparator XKP is supplied to interrogatory unit $Q_2CI$ to test whether or not bistable CI is in the 1 condition. If this is not the case it produces a No output to the error unit 18 but if this condition is true it produces a Yes output which is supplied to a further interrogatory unit $Q_2SKI$ to test whether or not bistable SKI is in the 1 condition. Such interrogatory units may take various forms as will be understood in the art but may basically be considered as electronic gates which are open or closed according to the state of the bistable device they are designed to interrogate. A simple version is illustrated in FIG. 3. A bistable BI is shown with set and reset inputs R and S and the two outputs A and B which in the reset or 0 condition respectively represent 0 and 1 and in the set condition respectively represent 1 and 0. The A output is connected to one input of a two-input AND gate G4 and the B output is connected to one input of a two-input AND gate G5, the other input to each of which is the Y output from comparator unit X. When the bistable BI is in the 1 condition output A is 1 and gate G4 is enabled to pass the Y output from comparator X to produce a Y or yes output. At the same time output B of bistable BI is 0 and gate G5 is inhibited. If, however, bistable BI is not in the 1 condition but is in the 0 condition then output A will be 0 and gate G4 inhibited and output B will be 1 and gate G5 enabled to pass the Y output from comparator X and produce an N or No output. The same simple circuit can be used to test the bistable BI for the 0 condition, the Y output from gate G4 then representing No and the N output from gate G5 then representing Yes.

In the event that SKI is not in the 1 condition interrogatory unit $Q_2SKI$ produces a No output which is supplied to error unit 18. If, however, interrogatory unit $Q_2SKI$ produces a Yes output this is fed to a further interrogatory unit $Q_1KPI$ to test whether bistable KPI is in the 0 condition. Its No output is supplied to the error unit 18 and its Yes output is supplied to S input of bistable KPI to set it in the 1 condition and to the R inputs of bistables SKI and CI to reset these to the 0 condition. It is further supplied to the accept character unit 16 to advance the pointer another step.

The Y output of comparator unit XSK is supplied to interrogatory unit $Q_1CI$ to test whether or not bistable CI is in the 1 condition. The No output is connected to the error unit 18 and the Yes output to a further interrogatory unit $Q_1SKI$ to test whether SKI is in the 0 condition. The No output is connected to the error unit 18 and the yes output is connected to the S input of SKI to set bistable SKI to the 1 condition and is also connected to the R inputs of bistables KPI and CI to reset these to the 0 condition. The Yes output of interrogatory unit $Q_1SKI$ is also connected to unit 16 to advance the pointer by a further step.

The Yes output of comparator XKE is connected to interrogatory unit $Q_3SKI$ to test whether bistable SKI is in the 1 condition. The No output of interrogatory unit $Q_3SKI$ is connected to error unit 18 and the Yes output is connected to the R input of bistable SKI to reset it to the 0 condition and is also connected to interrogatory unit $Q_3CI$ to test whether bistable CI is in the 1 condition. The No output of interrogatory unit $Q_3SKI$ is connected to the error unit 18 and the yes output to the R input of bistable CI to reset the latter to the 0 condition and to acceptance unit 19 which responds to generate an acceptance signal along line 20 to denote that the address is accepted. This acceptance is in fact denoted by the Y output of interrogatory unit $Q_3CI$.

It will be appreciated that the signals shown in FIG. 1 as being applied to set and reset boxes such as, for example, "Set KPI" are in fact applied to the set or reset terminals of the appropriate bistable.

In the operation of the input stage described the keyword pairs and associated information are entered at the keyboard 10 to the temporary store 11 and displayed on the screen 12. This also has the effect of resetting bistable units SKI, KPI and CI to the 0 condition. The status or condition of these bistables at various stages of the operation is set out in the table below:

| Enter $K_1/K_2$; $K_3/K_4$; $K_5/K_6$! | Condition of | | |
|---|---|---|---|
| Read | SKI | KPI | CI |
|  | φ | φ | φ |
| $K_1$ | φ | φ | 1 |
| / (spacer) | 1 | φ | φ |
| $K_2$ | 1 | φ | 1 |
| ; (terminal) | φ | 1 | φ |
| $K_3$ | φ | 1 | 1 |
| / (spacer) | 1 | φ | φ |
| $K_4$ | 1 | φ | 1 |
| ; (terminal) | φ | 1 | φ |
| $K_5$ | φ | 1 | 1 |
| / (spacer) | 1 | φ | φ |
| $K_6$ | 1 | φ | 1 |
| ! (terminal end) | φ | φ | φ |

A keyword $K_1$ - - $K_6$ changes CI to 1 state.
/ (spacer) only accepted when CI in 1 state (i.e., it follows a keyword and SKI in φ state (i.e., no preceding spacer without intervention of a terminal)
;! Terminal only accepted when CI in 1 state (i.e., it follows a keyword and SKI in 1 state (i.e., it has been preceded by a spacer)

The keyword pairs will be assumed to be $K_1/K_2$; $K_3/K_4$; $K_5/K_6$! The button or key 13 is operated to read the entered information. This operates unit 14 to set the electronic pointer to the first character space and unit 15 reads the symbol or character in that space. The reading unit 15 passes the information to comparison unit XKE which does not recognise a final terminal signal KE and passes the information through its N output to XSK unit which does not recognise a spacer signal SK. This produces a no answer at the N output of comparison unit XSK thus feeding the information being read to the next comparison unit XKP. This fails to recognise a keyword pair terminal signal KP and feeds the information through its N output to comparison unit XKC which recognises the first character of the first keyword $K_1$ and so produces an affirmative answer at its Y output which sets bistable to CI to the 1 condition and which also passes to unit 16 indicating acceptance of the character and this in turn operates pointer unit 17 to advance the pointer to the next character. If XKC had not recognised a keyword character it would have produced a signal out of its N output which would have triggered the error unit 18 into an alarm signal alerting the operator to an error. This alarm signal can take any suitable form and may be or include bringing up on the screen the word "error". As the electronic pointer would still be over the first keyword character the location of the error would be readily apparent. However, given that XKC recognised a keyword character, the states of bistables SKI, KPI and CI would respectively be 0, 0, 1. This would continue until the spacer signal SK is read. At this time XSK produces an interrogatory signal at its Y output which is supplied to interrogatory unit $Q_1CI$ to ascertain whether or not bistable CI is set in the 1 condition. If the answer is affirmative (which it is) it produces an interrogatory signal at its Y output to interrogatory unit $Q_1SKI$ to ascertain whether or not SKI is in the reset or 0 condition. If the answer is affirmative it produces a signal at its Y output which sets bistable SKI to the 1 condition, resets bistable KPI to the 0 condition (which it already has) and resets bistable CI to the 0 condition. It also indicates character acceptance to unit 16 which through pointer unit 17 advances the pointer to the next character to be read. The bistables SKI, KPI and CI are now respectively in conditions 1, 0, 0. The first character of the second keyword $K_2$ sets bistable CI to the 1 condition and at the end of reading the second keyword $K_2$ the bistables SKI, KPI and CI are respectively in conditions 1, 0, 1. next to be read is the keyword pair terminal signal KP. This is identified by unit XKP which produces an interrogatory signal at its Y output to interrogate interrogatory units $Q_2CI$ which ascertains whether or not bistable CI is set in the 1 condition. As the answer is affirmative it produces an interrogatory signal at its Y output to interrogatory unit $Q_2SKI$ to ascertain whether or not bistable SKI is set in the 1 condition. The answer is affirmative because the keyword pair terminal signal KP has been properly preceded by a spacer signal SK. This produces an interrogatory signal at the Y output of unit $Q_2SKI$ which interrogates interrogatory unit $Q_1KPI$ which ascertains whether or not bistable KPI is in the 0 condition. The answer being affirmative this produces an output signal at the Y output of $Q_1KPI$ which sets bistable KPI to the 1 condition, resets bistable SKI to the 0 condition, resets bistable CI to the 0 condition, indicates acceptance to the unit 16 and by unit 17 advances the pointer to the next character to be read. At this time bistables SKI, KPI and CI are respectively in conditions 0, 1, 0. the next character to be read is the first character of the next keyword $K_3$ and this proceeds as before, setting bistable CI to the 1 condition. Next to be read is the spacer signal SK which as before sets bistable SKI to the 1 condition and resets bistable KPI and CI to the 0 condition. At this time the bistables SKI, KPI and CI have the respective conditions 1, 0, 0. The next character to be used is the first character of the keyword Khd 4 and this proceeds as before, switching the bistable CI to the 1 condition so that at the end of reading $K_4$ the bistables SKI, KPI and CI have the respective conditions 1, 0, 1. The next character to be read is the keyword pair terminal symbol at the end of the second pair of keywords. This is identified by comparison unit XKP which interrogates interrogatory unit $Q_2CI$ which in turn interrogates interrogatory unit $Q_2SKI$ and this in turn interrogates interrogatory unit $Q_1KPI$ and causes bistable KPI to be set to the 1 condition, bistables SKI and CI to be reset to the 0 condition, and operates the character acceptance unit 16 to trigger pointer unit 17 to increment the pointer to the next character space. At this time the condition of the bistables SKI, KPI and CI is respectively 0, 1, 0. This, of course, is the same condition as prevailed at the end of reading the first keyword pair $K_1/K_2$;. The input stage then proceeds to read the next keyword $K_5$, spacer symbol / and keyword $K_6$ and at the end of reading keyword $K_6$ it has the same condition as at the end of reading $K_4$, namely bistables SKI, KPI and CI are respectively in conditions 1, 0, 1. The next symbol to be read is the symbol ! denoting the end of a set of keyword pairs. This is identified in comparison unit XKE which produces an affirmative answer at its Y output which interrogates interrogatory unit $Q_3SKI$ to ascertain whether or not bistable SKI is set in the 1 condition. This being affirmative, interrogatory unit $Q_3SKI$ produces a signal at its Y output which resets bistable SKI to the 0 condition and interrogates interrogatory unit $Q_3CI$ to ascertain whether bistable CI is set in the 1 condition. This being affirmative, interrogatory unit $Q_3CI$ produces a signal at its Y output which resets CI to the 0 condition and which activates acceptance unit 19 to produce an output signal at 20 which represents that the address signal $K_1/K_2$; $K_3/K_4$; $K_5/K_6$! has been read and accepted. At this time the bistable units SKI, KPI and CI will all be reset in the 0 condition.

It will be seen from the accompanying drawing that the N outputs of the interrogatory units $Q_1CI$, $Q_2CI$, $Q_3CI$, $Q_1SKI$, $Q_2SKI$, $Q_3SKI$ and $Q_1KPI$ are all connected to the error unit 18 so that in the event that the answer to an interrogation concerning the condition of bistables SKI, KPI and CI should be negative an error signal would be generated, the operator alerted and the character space identified. The output signal at output 20 indicating acceptance of the address may be used as required to store the address and associated information in the storage system (not shown) which follows the input stage. When entering information to store, the acceptance signal at output 20 may be used to initiate reading of the address and associated information in the temporary store 11 and feed it to the permanent store at appropriate corresponding addresses therein. Alternatively it may generate sequential code numbers and transfer the information to the store location identified by such code number and also enter that code number at addresses identified by the keyword pairs $K_1/K_2$; $K_3/K_4$; $K_5/K_6$!. Thus when that information is to be retrieved any one of the keyword pairs will identify that code number which in turn will identify the store location of the associated information for retrieval.

It will be appreciated that the input stage described for document entry or storage can also be used for retrieval. The same procedure is followed as described above but this time the acceptance of the address resulting in an output signal at output 20 is used to interrogate the store and retrieve the information associated with the keyword pairs.

It will be further appreciated that the characters passed from comparison unit XKP to comparison unit XKC (which should be keyword characters having been passed by comparison units XKE, XSK and XKP) may also be passed to a store unacceptable keywords with which they are compared so that in the event of an unacceptable keyword being used, the error signal is generated by error unit 18 and the address is rejected.

It will be appreciated that the comparison units XKE, XSK, XKP and XKC need not necessarily be in the sequence described and illustrated as each will identify its own symbol to halt further progress of the symbol being read through the sequence and to initiate its associated stage to test the condition of the relevant bistable devices and change the state thereof accordingly. It is only desirable that if the symbol being read should not be identified by the last comparison unit in the sequence at which it has arrived by virtue of the fact that the preceding comparison units have failed to identify the symbol that it should accordingly be rejected and an error signal generated.

It will also be appreciated that the comparison unit XKE is not an essential feature although it is desirable. In its absence, the final terminal signal ! would not be used and only the keyword pair terminal signal ; would be required to indicate the end of a keyword pair. The operator would see when the electronic pointer had read the last symbol in the addresses and could then check electronically whether or not bistables SKI, KPI, and CI are respectively in the 0, 1, and 0 conditions and, if so, cause the address to be accepted.

It will be understood that the interrogatory units described above effectively act as electronic gates which are open or closed according to the stage of the bistable device they are designed to interrogate. If the gate is open this indicates that the associated bistable device is in the designated condition and the interrogating signal passes through. If the gate is closed, the associated bistable device is not in the designated condition and the interrogating signal is diverted to alert the error unit 18 to generate an error signal.

As has been explained, the system described is intended to accept only keyword pairs. In the event that an exception is to be made and only a single keyword is to be used then that single keyword may be paired with a recognised dummy keyword for entry into the system. There may however be occasions when it is desired to retrieve from the store information associated with a single keyword. For this purpose, the system described may be modified to accept single keywords although not in combination with keyword pairs. Such modification is illustrated in dotted lines in FIG. 1 and will be readily understood from the following description. A further bistable device KPR is provided with associated gates or interrogatory units $Q_1KPR$, $Q_2KPR$ and $Q_3KPR$. The bistable device KPR is set by the operator to the 1 condition when keyword pairs are to be used and to the 0 condition when single keywords are to be employed. For the present example it is assumed that the terminal signal / is used to indicate the end of a keyword so that an address signal could be $K_1/K_2/K_3/K_4$! Thus when single keywords are used, the spacer signal is rejected. The interrogatory unit $Q_1KPR$ is inserted between the Y output of comparison unit XSK and the input to interrogatory unit $Q_1CI$ and arranged to be open or produce a signal at its Y output when the KPR bistable device is in the 0 condition, i.e. when keyword pairs are being used. Its N output is connected to error unit 18. Interrogatory unit $Q_2KPR$ is connected between the Y output of interrogatory unit $Q_2CI$ and the input to interrogatory unit $Q_2SKI$ and is arranged to test whether or not KPR bistable device is set in the 1 condition. If the answer is affirmative it provides an output at its Y output to the interrogatory unit $Q_2SKI$, if the answer is negative it provides an output at its N output which is connected to the input to interrogatory unit $Q_1KPI$ thus by-passing interrogatory unit $Q_2SKI$. Interrogatory unit $Q_3KPR$ is connected between the N output of interrogatory unit $Q_3SKI$ and the error unit 18 and is designed to test whether or not KPR is set in the 1 condition. If the answer is affirmative it provides a signal at its Y output to the error unit 18 and if the answer is negative it provides a signal at its N output to the interrogatory unit $Q_3CI$. It will be understood from the above that with the bistable KPR set in the 1 condition, i.e. for the acceptance of keyword pairs, the gates represented by interrogatory units $Q_1KPR$, $Q_2KPR$ and $Q_3KPR$ are all open and the system operates as before. However, when bistable device KPR is in the 0 condition, i.e., for the acceptance of single keywords, spacer signals should not be accepted. It will be seen that if a spacer signal is identified by comparison unit XSK, interrogatory unit $Q_1KPR$ rejects the signal through its Y output to error unit 18. Interrogatory unit $Q_2KPR$ operates to by-pass interrogatory unit $Q_2SKI$ to avoid an error signal being generated because bistable SKI is in the 0 condition. Upon a final terminal signal being identified by comparison unit XKE the interrogatory unit $Q_3SKI$ generates a negative answer at its N output because bistable SKI is in the 0 condition. This is intercepted by interrogatory unit $Q_3KPR$ and, with bistable KPR in the 0 condition is supplied to the input of interrogatory unit $Q_3CI$ instead of to error unit 18. It will be understood the keywords, spacer signal SK, terminal signal KE, and keyword pair terminal signal KP will be stored in the temporary store 1 and read to the comparator units in an appropriate encoded binary form at least a part of which will uniquely identify the stored data as representing a keyword, a spacer signal, a terminal signal or a keyword pair terminal signal. It will be noted that in fact the last three signals SK, KE and KP are fixed signals of constant form and hence self identifying. Only the keywords can vary to identify $K_1$, $K_2$, $K_3$ and so on. Therefore only the keyword data need have a constant portion identifying it as a keyword and the comparator XKC would only need to identify that constant portion.

What is claimed is:
1. An input stage for use in an information storage system comprising:
   a. means operable to enter into said input stage an address comprising separately identifiable keyword character signals, a spacer signal and a terminal signal,
   b. reading means operable to read the entered address sequentially in steps,
   c. comparison means connected to said reading means and operable to separately identify said separately identifiable address signals and produce a corresponding separate match signal, and
   d. gate means responsive to said separate match signals occurring in the sequence of a match signal representing identification of a key word character signal, a match signal representing identification of a spacer signal, a match signal representing identification of a keyword character signal and a match signal representing identification of a terminal signal to signal acceptance of said address.

2. An input stage for use in an information storage system comprising
   a. means operable to enter into said input stage an address comprising separately identifiable keyword character signals, a spacer signal and a terminal signal,
   b. reading means operable to read the entered address sequentially in steps,
   c. comparison means interconnected to respond to each of a first keyword character signal, a spacer signal, a second keyword character signal and a terminal signal,
   d. said comparison means to respond to each of said signals including a plurality of stage means comprising
      a first of said stage means to identify the keyword character signal,
      a second of said stage means to identify the spacer signal, and
      a third of said stage means to identify the terminal signal,
      said second and third stage means to operate to reject the address signal in the absence of a previously identified keyword character signal by said first stage means,
      and said third stage means to further operate to reject the address signal in the absence of a previously identified spacer signal by said second stage means.

3. An input stage according to claim 2, further characterized by
   a plurality of bistable means to selectively switched to a one stable condition or a different other stable condition including a keyword character bistable means, a spacer signal bistable means, and a terminal signal bistable means,
   one of each of said bistable means operatively associated with each of said stage means,
   said first stage means operable to set said keyword character bistable means to a one stable condition upon identifying a keyword character in said keyword character signal,
   said second stage means operable to check that said keyword character bistable means is in a one stable condition and said spacer signal bistable means is in a different other stable condition before setting said spacer signal bistable means to a one stable condition,
   and said third stage means operable to check that both said keyword character bistable means and said spacer signal bistable means are in a one stable condition before setting said terminal signal bistable means to a one stable condition.

4. An input stage according to claim 3, further characterized by
   said third stage, on setting said terminal signal bistable means to a one stable condition, being operable to reset said spacer signal bistable means and said keyword character bistable means to the other stable condition.

5. An input stage according to claim 3, further characterized by
said second stage, on setting said spacer signal bistable device to a one stable condition, being operable to reset said terminal signal bistable means and said keyword character bistable means to the other stable condition.

6. An input stage according to claim 3, further characterized by
a fourth stage means to identify an end terminal signal representing the end of an address signal and upon identifying the end terminal signal to check that said spacer signal bistable means is in a one stable condition and reset said spacer signal bistable means to the other stable condition, to check that said keyword character bistable means is in a one stable condition and reset said keyword character bistable means to the other stable condition, and to generate an acceptance signal.

7. An input stage according to claim 2, further characterized by
means to receive a signal to accept an address signal character and to advance said reading means one step.

8. An input stage according to claim 2, further characterized by
said comparison means operable to receive the address signal, symbol by symbol, and to generate output signals respectively identifying the keyword character signals, the spacer signal, the terminal signal, and an unacceptable symbol signal,
a plurality of bistable means to be selectively switched to a 1 or to an 0 stable condition including
a keyword character bistable means responsive to a keyword character identifying output signal to change its state from the 0 to the 1 condition,
a spacer signal bistable means responsive to a spacer signal identifying output signal to change its state from the 0 to the 1 condition,
a terminal signal bistable means responsive to a terminal signal identifying output signal to change its state from the 0 to the 1 condition,
said comparison means including
means responsive to the 1 condition of said keyword character bistable means and the 0 condition of said spacer signal bistable means to change the state of the spacer signal bistable means to the 1 condition, reset or maintain said terminal signal bistable means in the 0 condition and reset said keyword character bistable means to the 0 condition upon the occurrence of a spacer signal identifying output signal,
and means responsive to the 1 condition of said keyword character bistable means, the 1 condition of said spacer signal bistable means and the 0 condition of said terminal signal bistable means to change the state of said terminal signal bistable means to the 1 condition, reset said spacer signal bistable means to the 0 condition and reset said keyword character bistable means to the 0 condition upon the occurrence of a terminal signal identifying output signal.

9. An input stage according to claim 8, further characterized by
a temporary storing means to hold the address signal and means for advancing said reading means step by step in response to the occurrence of any one of the following conditions:

a. the state of said keyword character bistable means is changed to the 1 condition in response to a keyword character identifying output signal;
b. the state of said keyword character bistable means is reset to the 0 condition upon the occurrence of a spacer signal identifying output signal and,
c. the state of said keyword character bistable means is reset to the 0 condition upon the occurrence of a terminal signal identifying output signal.

10. An input stage according to claim 8, further characterized by
said comparison means being operable to produce an output signal identifying the received address signal symbol as an end terminal signal representing the end of an address signal,
and means responsive to the 1 condition of said spacer signal bistable means and the 1 condition of said keyword character bistable means to reset both said spacer signal and keyword character bistable means to the 0 condition and to generate an acceptance signal representing acceptance of the address signal upon the occurrence of the end terminal signal identifying output signal.

11. An input stage for use in an information storage system comprising
a. means operable to enter into said input stage an address comprising keyword character signals, a spacer signal and a terminal signal,
b. reading means operable to read the entered address sequentially in steps,
c. comparison means connected to said reading means and operable to identify separately within said address a keyword character signal, a spacer signal and a terminal signal to produce a corresponding separate match signal upon identifying any one of said address signals,
d. first gate means set by the match signal identifying a keyword character signal to pass the match signal identifying a spacer signal,
e. second gate means set by the sequential occurrence of the match signal passed by said first gate means and a match signal identifying a keyword character signal to pass the match signal identifying a terminal signal thereby signalling acceptance of the address only when in the sequence of a keyword character signal, a spacer signal, a keyword character signal and a terminal signal.

12. An input stage for use in an information storage system comprising
a. means operable to enter into said input stage an address comprising keyword character signals, a spacer signal and a terminal signal,
b. reading means operable to read the entered address sequentially in steps
c. comparison means connected to said reading means to receive the address being read and including
  1. a first comparator unit operable to identify a keyword character signal and produce a corresponding keyword match signal,
  2. a second comparator unit operable to identify a spacer signal and produce a corresponding spacer match signal, and
  3. a third comparator unit operable to identify a terminal signal and produce a corresponding terminal match signal,
d. a keyword bistable unit capable of assuming either one of two stable conditions and of being reset to one of said two conditions and of being set to the other of said two conditions and responsive to the keyword match signal to assume the set condition, e. a spacer bistable unit capable of assuming either one of two stable conditions and of being reset to one of said two conditions and of being set to the other of said two conditions, f. a terminal bistable unit capable of assuming either one of two stable conditions and of being reset to the one of said two conditions and of being set to the other of said two conditions, g. first gate means connected to said second comparator unit and responsive to the set condition of said keyword bistable unit and the reset condition of said spacer bistable unit to pass said spacer match signal and set said spacer bistable unit to the set condition and reset both said keyword bistable unit and said terminal bistable unit to the reset condition, h. second gate means connected to said third comparator and responsive to the set condition of the keyword bistable unit, the set condition of the spacer bistable unit and the reset condition of the terminal bistable unit to pass said terminal match signal and set said terinal bistable unit to the set condition and reset both said spacer bistable unit and said keyword bistable unit to the reset condition and signal acceptance of an address only when in the sequence of a keyword character signal, a spacer signal, a keyword character signal and a terminal signal.

13. An input stage for use in an information storage system comprising
    a. means operable to enter into said input stage an address comprising keyword character signals, a spacer signal, a terminal signal and a final terminal signal,
    b. reading means operable to read the entered address sequentially in steps,
    c. comparison means connected to said reading means to receive the address being read and including
        1. a first comparator unit operable to identify a keyword character signal and produce a corresponding keyword match signal,
        2. a second comparator unit operable to identify a spacer signal and produce a corresponding spacer match signal,
        3. a third comparator unit operable to identify a terminal signal and produce a corresponding terminal match signal, and
        4. a fourth comparator unit operable to identify a final terminal signal and produce a corresponding final terminal match signal
    d. a keyword bistable unit capable of assuming either one of two stable conditions and of being reset to one of said two conditions and of being set to the other of said two conditions and responsive to the keyword match signal to assume the set condition,
    e. a spacer bistable unit capable of assuming either one of two stable conditions and of being reset to one of said two conditions and of being set to the other of said two conditions,
    f. a terminal bistable unit capable of assuming either one of two stable conditions and of being reset to the one of said two conditions and of being set to the other of said two conditions,
    g. first gate means connected to said second comparator unit and responsive to the set condition of said keyword bistable unit and the reset condition of said spacer bistable unit to pass said spacer match signal and set said spacer bistable unit to the set condition and reset both said keyword bistable unit and said terminal bistable unit to the reset condition,
    h. second gate means connected to said third comparator and responsive to the set condition of the keyword bistable unit, the set condition of the spacer bistable unit and the reset condition of the terminal bistable unit to pass said terminal match signal and set said terminal bistable unit to the set condition and reset both said spacer bistable unit and said keyword bistable unit to the reset condition,
    i. third gate means connected to said fourth comparator and responsive to the set condition of the spacer bistable unit to pass said final terminal match signal to reset the spacer bistable unit to the reset condition and further responsive to the set condition of the spacer bistable unit and the keyword bistable unit to pass the final terminal match signal and reset the keyword bistable unit to the reset condition and signal acceptance of an address only when in the sequence of a keyword character signal, a spacer signal, a keyword characater signal and a final terminal signal.

14. A method of operating an information storage system which comprises entering an address signal into the system, reading the address signal symbol by symbol to generate recognition signals identifying the symbol either as a keyword character, a spacer signal, a terminal signal, or as an unacceptable symbol, utilising each keyword character recognition symbol to set a keyword character bistable device to the 1 condition, utilising each spacer signal recognition signal to change the state of a spacer signal bistable device to the 1 condition in the event that the spacer signal bistable device is initially in the 0 condition and the keyword character bistable device is in the 1 condition, and utilising each terminal signal recognition signal to set a terminal signal bistable device to the 1 condition in the event that the keyword character bistable device is in the 1 condition, the spacer signal bistable device is in the 1 condition and the terminal signal bistable device is initially in the 0 condition.

15. A method according to claim 14 in which each spacer signal recognition signal is further utilised to reset or maintain the terminal signal bistable device in the 0 condition and reset the keyword characater bistable device to the 0 condition in the event that the spacer signal bistable device is initially in the 0 condition and the keyword character bistable device is in the 1 condition.

16. A method according to claim 14 in which each terminal signal recognition signal is further utilised to reset the spacer signal and the keyword character bistable devices to the 0 condition in the event that the keyword character bistable device is in the 1 condition, the spacer signal bistable device is in the 1 condition and the terminal signal bistable device is initially in the 0 condition.

* * * * *